United States Patent Office 3,496,176
Patented Feb. 17, 1970

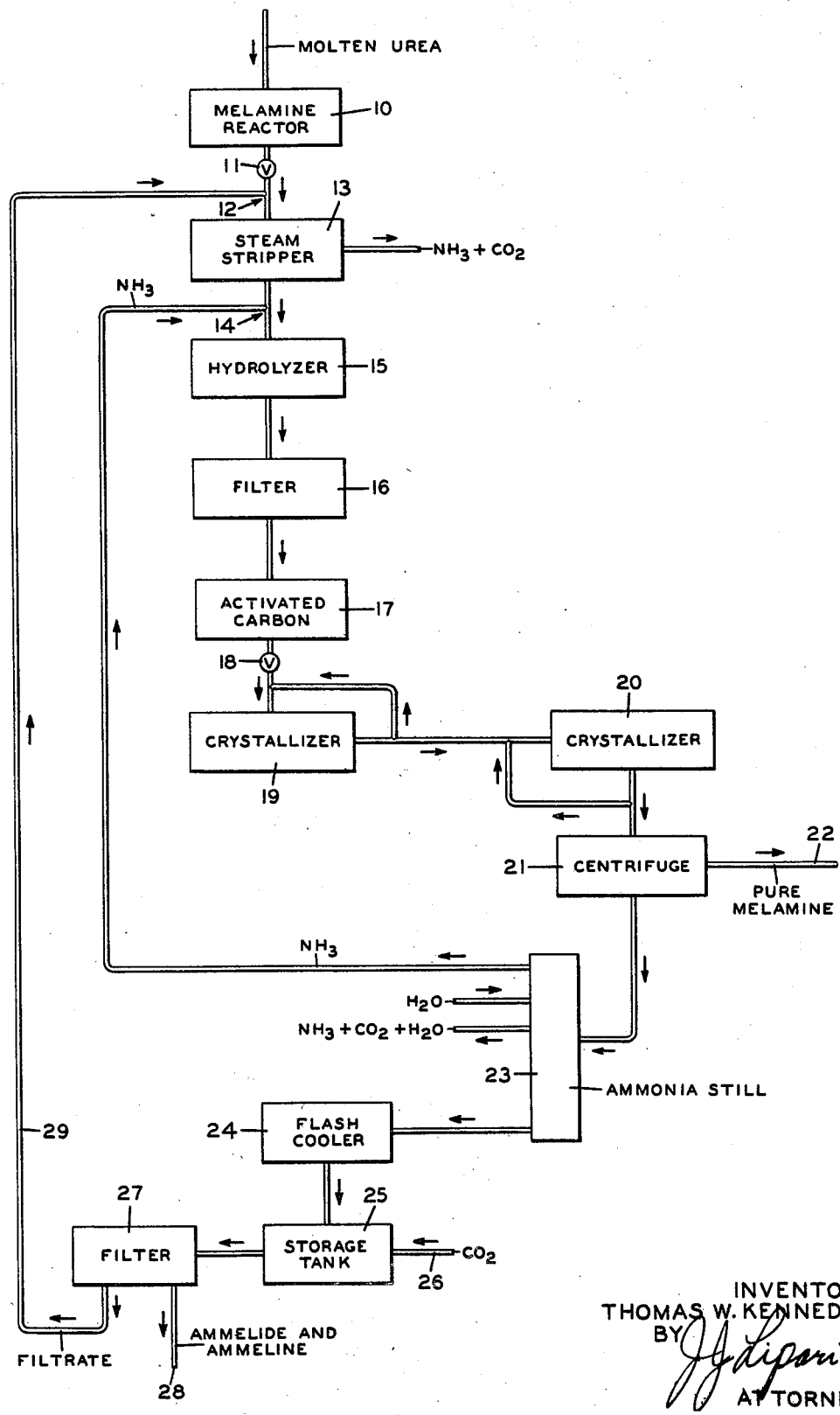

3,496,176
MELAMINE PURIFICATION
Thomas W. Kennedy, Richmond, Va., assignor to Allied Chemical Corporation, New York, N.Y., a corporation of New York
Filed June 19, 1968, Ser. No. 738,290
Int. Cl. C07d 55/24
U.S. Cl. 260—249.7
15 Claims

ABSTRACT OF THE DISCLOSURE

A process for purifying a melamine solution containing hydroxytriazine impurities wherein the solution is acidified to pH not greater than about 7 with an acid, e.g. carbon dioxide, which forms soluble salts with melamine. Upon crystallization, up to about 80% of the hydroxytriazine is removed from the solution. The solution must be substantially free of ammonia prior to acidifying in order to get good separation of the hydroxytriazine. In a process for purification of melamine produced by heating an aquo-ammono carbonic acid, such as urea, complete recovery of melamine can be achieved by the present improvement.

BACKGROUND OF THE INVENTION

This invention relates to a process for the purification of melamine containing hydroxytriazine impurities; in particular, it relates to an improved process wherein melamine is purified and ammeline and ammelide are recovered from a dilute aqueous solution containing melamine, ammelide and ammeline.

It is known to produce melamine by heating urea, biuret, cyanuric acid or other aquo-ammono carbonic acid alone or together with added ammonia, under suitable high temperatures and pressures. The crude product obtained is a mixture of melamine, ammonia, carbon dioxide, unreacted urea and hydrozytriazine impurities, e.g., ammelide and ammeline. It is known from U.S. Patent 3,161,638 to purify the crude melamine by stripping it of its carbon dioxide content, digesting the stripped material in 8 to 28% aqueous ammonia, and thereafter crystallizing the purified melamine from the digestion mixture. The melamine-aqueous ammonia solution from the digester is filtered, treated with activated carbon, and cooled to crystallize the purified melamine. Since this solution generally contains about 1 to 10% by weight of dissolved impurity based on the melamine content, it is generally desirable to crystallize melamine from the solution at temperatures of about 20–50° C. under ammonia pressure to prevent the dissolved impurities from coprecipitating with the melamine. However, in crystallizing melamine at these temperatures, a substantial amount of the total melamine in the advancing stream remains dissolved in the aqueous ammonia mother liquor, and in recovering the melamine by conventional means (centrifugation and filtration), this quantity of dissolved melamine product is lost from this part of the process.

U.S. Patent 3,161,638 discloses the best known method to further process the mother liquor to separate the melamine from the hydroxytriazines. In accordance with this patent, the filtrate from the crystallized melamine is distilled to recover the ammonia content and then cooled to crystallize ammelide and ammeline. However, as indicated in the patent, separation is not complete and much of the ammelide and ammeline remains in solution. For this reason, difficulties often arise when the residual melamine solution is recycled in the process so that overall melamine yields are reduced.

U.S. Patent 3,132,143 teaches the use of carbon dioxide and ammonia in the process of recovering melamine, specifically, the use of carbon dioxide in conjunction with ammonia to transform impurities and by-products into easily separable materials. After crystallization and removal of melamine, relatively small amounts of ammelide and ammeline can be precipitated from the mother liquor which is saturated with ammonia and carbon dioxide; however, a substantial amount of the ammeline and ammelide still remains in solution.

SUMMARY OF THE INVENTION

According to the present invention, an hydroxytriazine is separated from melamine in a dilute aqueous solution containing melamine and hydroxytriazine by acidifying the solution to a pH not greater than about 7 with an acid which forms soluble salts with melamine, and then crystallizing and separating the hydroxytriazine from the acidified solution. When a solution of melamine and hydroxytriazine also contains ammonia, it is essential to strip the ammonia from the solution, thereby affording a substantially ammonia-free solution, which is then acidified according to the present invention.

The instant invention is especially advantageous in recovering melamine in the presence of hydroxytriazine impurities from an ammoniacal solution. This recovery process includes the steps of crystallizing and separating a major portion of the melamine from the solution; stripping ammonia from the resulting mother liquor; acidifying the substantially ammonia-free liquor to a pH not greater than about 7 with an acid which forms soluble salts with melamine; and then crystallizing and separating the hydroxytriazine from the acidified liquor. The resulting liquor may then be recycled through the recovery process to afford complete recovery of the melamine.

BRIEF DESCRIPTION OF THE DRAWING

For a better understanding of the instant invention, reference is made to the accompanying drawing, which represents schematically the process of the invention.

DETAILED DESCRIPTION OF THE INVENTION

The instant invention provides a more efficient recovery of melamine from an aqueous ammonia-dissolved impurities solution containing less than 1% melamine and less than 1% hydroxytriazines, said process being capable of recovering substantially all of the melamine and 70–80% or more of the hydroxytriazine impurities.

The invention affords efficient separation of an hydroxytriazine from melamine in any dilute aqueous solution; however, it will be described herein as a part of the process of recovering melamine from a solution produced by heating an aquo-ammono carbonic acid. Thus, in this respect, the present invention may be considered an improvement over the process of U.S. Patent 3,161,638.

According to the present invention, after separation of melamine crystals by centrifugation, according to a well known process such as the one disclosed in U.S. Patent 3,161,638, mother liquor is sent to an ammonia recovery still where essentially all the ammonia is taken overhead. Bottoms from the still are cooled to about 45° C. whereupon a thin slurry results containing small amounts of ammelide ad ammeline. According to the present invention, the slurry is adjusted to pH 7 or lower, preferably 6–7, with an acidic substance such as carbon dioxide, nitric acid or other acid that does not form insoluble melamine compounds. At this acidic pH, the precipitation of ammelide and ammeline is at least 70–80% complete. The ammelide and ammeline are separated from the slurry, for example, by filtration, and the liquor containing melamine is returned to process. This return of melamine to the process results in ultimate recovery of substantially all the melamine as melamine crystal. The recovered ammelide and ammeline may be used as a slowly available nitrogen fertilizer, or may be used in the preparation of additional melamine.

With reference to the drawing, crude melamine, produced by pyrolysis of an aquo-ammono carbonic acid (e.g., urea, biuret, triuret, cyanuric acid, cyanic acid, ammelide or ammeline) and accompanied by the gaseous products of the pyrolysis reaction, passes out of reactor 10 through let-down valve 11, whereupon it is quenched at about 10 to 20 p.s.i.g. pressure and 100–110° C., by contact with a recycled dilute filtrate which includes melamine at junction 12.

Upon quenching, the melamine mixture produces a partly vaporized mixture of water, ammonia and carbon dioxide. The resultant liquid is in the form of a slurry and includes water, ammonia, carbon dioxide, crude melamine and impurities such as ammelide and ammeline. The quenched slurry is fed to a stripping column, such as a steam stripper 13, wherein carbon dioxide is substantially removed to the extent that the carbon dioxide content remaining is less than 3% by weight, preferably less than 1% by weight.

The slurry stream leaving the stripper 13 is joined at junction 14 by an anhydrous liquid ammonia stream, the resulting slurry stream having a weight ratio of 10 to 40 parts ammonia to 1 part of insoluble impurities in the crude melamine. The weight ratio of water to total melamine in the slurry stream is about 7 to 1, but can be varied if necessary to maintain operating pressure below 450 p.s.i.g. At this point the slurry can also be saturated with oxygen in order to assure a product which is free from any discoloration.

The ammoniacal slurry stream flows to a hydrolyzer 15, which operates at about 250–450 p.s.i.g., the stream being heated to 140–230° C., preferably about 150–180° C. The total hold-up time in hydrolyzer 15 is about 25 to 50 minutes, the hold-up time decreasing as the temperature increases within said range. The ammoniacal solution of melamine leaving hydrolyzer 15 is passed through a filter 16 to remove any minor amounts of undissolved material, the filtrate then being treated with carbon at 17. The solution is then reduced in pressure through let-down valve 18 and cooled by direct mixing with recycle stream from a first crystallizer 19, such as a conventional shell and tube exchanger, prior to passage through said crystallizer. The recycled ratio is adjusted to give a temperature of about 50° C. to 60° C. to the material in crystallizer 19, the operating pressure being controlled between about 15 and 100 p.s.i.g. on the process side to hold all the ammonia in solution. The cooled slurry is held in this temperature range for at least one minute and preferably for about 5 to 10 minutes to permit growth of melamine crystals. Most of the slurry exiting the first crystallizer 19 is recycled to quench the filtered ammoniacal solution of melamine from hydrolyzer 15 as mentioned above. The remainder is cooled to about 30° C. by mixing it with a melamine slurry being recycled from second crystallizer 20. The cooled stream is then passed to said second crystallizer 20 to crystallize additional melamine from the ammonia water and dissolved impurities. Part of the slurry exiting the second crystallizer 20 is recycled, as mentioned hereinabove, to cool the stream advancing into second crystallizer 20. The remainder of the slurry exiting second crystallizer 20 is passed into a centrifuge or filter 21, wherein crystallized melamine is separated from the slurry and exits via line 22, whereupon it is collected.

The aqueous mother liquor remaining after removal of melamine at 21 contains ammonia, carbon dioxide, and dissolved ammeline, ammelide, and melamine. The liquor is pumped to a pressure of about 235 p.s.i.g., heated to about 100° C., and fed to a conventional distillation column, referred to as an ammonia still 23, which operates at about 235 p.s.i.g. and a bottom temperature of about 205° C. for separation of the ammonia overhead.

The ammonia column bottoms liquor, which includes water, ammeline, ammelide, and melamine, is cooled to about 45° C. by conventional means such as a flash cooler 24. The cooled ammonia column bottoms liquor is fed to a storage tank 25 where the pH is adjusted to 7 or below, preferably between 6 and 7, and preferably by addition of carbon dioxide through line 26. Within 15–60 minutes at least about 70–80% of the ammeline and ammelide precipitates and agitation of the mixture is provided to prevent settling of the precipitated solids.

While carbon dioxide has been disclosed as the preferred acid for the purpose of this invention, any acid which forms soluble salts with melamine is adequate, for example, nitric acid, hydrochloric acid and the like. Use of carbon dioxide is preferred because it is readily removed from the system by steam stripping. The acid used should have an ionization constant at least as great as carbonic acid, which is $4.5 \times 10^{-7}$ at 25° C.

Acidification of the solution insures precipitation of the ammelide and ammeline by destroying what are believed to be soluble ammonia complexes of these compounds. For this reason, it is essential in the instant invention that the carbon dioxide, or other acid, be added to a substantially ammonia-free solution. It has been found that as little as about 0.5% free ammonia in the solution will substantially decrease the amount of ammelide and ammeline which can be crystallized and separated.

The rate of carbon dioxide addition will depend on the concentration of these soluble ammonia complexes and the pH to be maintained. Specifically about 2.5 parts of carbon dioxide per part of hydroxytriazines, by weight, is desirable.

The storage solution is passed through a filter 27, perferably precoated with a filter aid such as diatomaceous silica, whereupon the precipitated ammelide and ammeline are removed through line 28. Filter aid is preferably added continuously to the filter feed to assist in the removal of the fine precipitate. The relatively cool filtrate containing melamine is preferably employed for recycling through line 29 for quenching crude hot melamine from reactor 10 at junction 12.

Although the instant invention has been described hereinabove as an improvement over the specific recovery process of U.S. Patent 3,161,638, it is understood that this is merely one specific melamine recovery process in which the instant invention may be used. Modification and alterations may be made in this overall process without affecting the advantage to be gained by utilizing the instant invention.

The following examples are provided to more fully illustrate the instant invention. These examples are provided for illustrative purposes only and are not to be construed as limiting the invention, which is defined by the appened claims.

Example I

Molten urea is supplied to a melamine reactor in which it is heated under a pressure of 2000 p.s.i.g. to a temperature of 425° C. The effluent from the reactor is quenched to about 110° C. with recycled filtrate hereinafter particular described. The quenched effluent is then passed into a stripper in which ammonia and carbon dioxide are stripped from the material by direct contact with steam at 100–115° C. under a pressure of 10 p.s.i.g. Ammonia and carbon dioxide are taken off overhead and a melamine slurry is withdrawn from the bottom of the stripper.

Anhydrous liquid ammonia is introduced into the stream exiting from the stripper, in the weight ratio of one part ammonia per 4.6 parts water present in the slurry, equivalent to a 22% aqueous ammonia. This ammoniacal slurry is then introduced into a hydrolyzer where it is heated to 170–180° C. under pressures of 250–300 p.s.i.g.

for a period of 30 minutes, after which time the resulting solution is filtered to remove any solids present, and then is passed through a bed of activated carbon.

The resulting solution has a temperature of 140% C. and a pressure of 400 p.s.i.g., and contains on a weight basis 16% ammonia, 10.0% melamine and 0.3% impurities, including ammelide and ammeline. The solution is reduced in pressure to 30 p.s.i.g. and quenched to about 52–53° C. by direct contact with an ammoniacal melamine slurry being recycled after exiting the first crystallizer mentioned below. Upon being quenched, a substantial portion of the melamine crystallizes from the solution, while the impurities are retained in solution. The resulting slurry is fed to a first crystallizer, which is a shell and tube heat exchanger, where it is further cooled to 50° C. It is held at about 50–53° C. temperature in the crystallizer for about five minutes. Part of the ammoniacal melamine slurry exiting from the crystallizer is recycled to quench the solution advancing from the activated carbon bed, as mentioned above, and the remainder of the crystallizer effluent is cooled to about 25° C. by mixing with slurry being recycled from a second crystallizer. The cooled slurry is then fed to the second crystallizer, also a shell and tube type heat exchanger, and cooled to about 20° C. until precipitation of melamine crystals is complete. Part of the resulting slurry is recycled to cool the material coming from the first crystallizer. The remainder is centrifuged and fitered at 25° C., and the melamine crystals so recovered and dried. Melamine recovery from the solution is found to be about 95%.

Mother liquor from the melamine centrifugation contains about 18% ammonia, 0.1% carbon dioxide, 0.5% melamine and 0.3% ammeline and ammelide. This stream is sent to an ammonia column to recover the ammonia content. The liquor is pumped to column pressure, 235 p.s.i.g., heated to 100° C., and fed to the middle section of the column. Column temperature range from 44° C. at the top to 205° C. at the base. This unit is a conventional 18-plate column with external condenser and with direct steam injection in the base of the column. Anhydrous liquid ammonia is removed from the condenser, a portion being returned to the column as reflux. Ratio of reflux to product ammonia is about 3. The recovered ammonia may be recycled to ammoniate the process stream flowing to the hydroyzer from the stripper.

Because of the tendency for gradual accumulation of carbon dioxide in the column, about 1 part of water per 24 parts by weight of column feed is preferably added to the column at a point 4 plates above the main feed plate and an equivalent side stream is removed 2 plates below the water addition point. This side stream contains ammonia, carbon dioxide and water and effectively prevents build up of carbon dioxide in the column.

The ammonia column bottoms liquor is substantially free of ammonia; however, a small proportion of ammonia appears to be combined with the hydroxytriazines as a complex. The ammonia column bottoms liquor consists of ammelide, ammeline and melamine dissolved in water at 235 p.s.i.g. and 205° C. The liquor is flash cooled to about 45° C. in two pressure let-down stages. In the first stage, the pressure is let down from 235 p.s.i.g. to 20 p.s.i.g. In the second stage, the pressure is let down from 20 p.s.i.g. to about 28 inches of Hg vacuum in the vacuum flash cooler. Vacuum is maintained by means of a barometric condenser and two-stage air pump.

The cooled column bottoms liquor flows from the vacuum flash tank to the column bottoms storage tank. Agitation is provided for mixing and to prevent settling-out of the precipitated solids. Hold up time in the storage tank is about 30 minutes.

The pH of the storage solution is adjusted to 6–7 by the addition of about 2.5 parts by weight of carbon dioxide per part of ammelide and ammeline.

The precipitated ammelide and ammeline are removed from the storage solution by means of filters precoated with filter aid, and the filtrate is returned to the process to quench the effluent from the melamine reactor. Filter aid slurry is added continuously to the filter feed to aid in the removal of the fine precipitate. About 3% filter aid is used, based on the weight of ammelide and ammeline. About 77% of the ammelide and ammeline in the ammonia column bottoms is recovered on the filters. This mixture is then dried.

Example II

The procedure of Example I is repeated wherein nitric acid is substituted for the carbon dioxide to acidify the ammonia column bottoms to pH 6–7. Approximately 78% of the ammelide and ammeline in the ammonia column bottoms is recovered.

Example III

The procedure of Example I is repeated wherein a 1.5-foot diameter packed column with 50 feet of ceramic packing is used for distilling the ammonia, resulting in the ammonia column bottoms containing about 0.5% free ammonia. On treatment of the ammonia column bottoms with carbon dioxide according to the procedure of Example I, a slightly alkaline mixture containing ammonium carbonates is formed. The average pH during a 30-minute test period is about 8.0. Recovery of ammelide and ammeline is only about 33%, based on ammelide and ammeline in the ammonia column bottoms, compared with 77% recovery in Example I under similar conditions except for the absence of ammonia and ammonium carbonates in the ammonia column bottoms.

What is claimed is:

1. In a process for separating an hydroxytriazine from melamine in a dilute aqueous solution containing melamine and hydroxytriazine, which process comprises crystallizing and separating the hydroxytriazine from the melamine-containing mother liquor, the improvement which comprises acidifying the aqueous solution to a pH not greater than about 7 with an acid which forms soluble salts with melamine, prior to crystallizing the hydroxytriazine.

2. In a process according to claim 1, the improvement wherein said hydroxytriazine is selected from the group consisting of ammelide, ammeline and mixtures thereof.

3. In a process according to claim 2, the improvement wherein said acid is carbon dioxide.

4. In a process according to claim 2, the improvement wherein said solution is acidified to a pH from about 6 to 7.

5. In a process for separating ammelide and ammeline from melamine in a dilute aqueous solution consisting essentially of melamine, ammelide and ammeline, which process comprises crystallizing and separating the ammelide and ammeline from the melamine-containing mother liquor, the improvement which comprises acidifying the aqueous solution with carbon dioxide to a pH from about 6 to 7, prior to crystallizing the ammelide and ammeline.

6. In a process for separating an hydroxytriazine from melamine in an aqueous ammoniacal solution having dissolved therein minor amounts of melamine and an hydroxytriazine, which process comprises crystallizing and separating the hydroxytriazine from the melamine-containing mother liquor, the improvement which comprises:
    stripping the ammonia from the solution; and
    then acidifying the substantially ammonia-free solution to a pH not greater than about 7 with an acid which forms soluble salts with melamine, prior to crystallizing the hydroxytriazine.

7. In a process according to claim 6, the improvement wherein said hydroxytriazine is selected from the group consisting of ammelide, ammeline and mixtures thereof.

8. In a process according to claim 7, the improvement wherein said acid is carbon dioxide.

9. In a process according to claim 7, the improvement wherein said solution is acidified to a pH from about 6 to 7.

10. In a process for separating ammelide and ammeline from melamine in an aqueous ammoniacal solution having dissolved therein less than 1% each of melamine, ammelide and ammeline, which process comprises crystallizing and separating the ammelide and ammeline from the melamine-containing mother liquor, the improvement which comprises:

stripping the ammonia from the solution; and
then acidifying the substantially ammonia-free solution with carbon dioxide to a pH from about 6 to 7, prior to crystallizing the ammelide and ammeline.

11. In a process for recovering melamine from an hydroxytriazine impurity-containing ammoniacal solution produced by heating an aquo-ammono carbonic acid, which process comprises the steps of crystallizing and separating a major portion of said melamine from the solution and then crystallizing and separating the hydroxytriazine from the mother liquor, the improvement which comprises:

stripping the ammonia from the mother liquor after separating said major portion of melamine from the solution; and then
acidifying the substantially ammonia-free liquor to a pH not greater than about 7, prior to said step of crystallizing the hydroxytriazine, with an acid which forms soluble salts with melamine.

12. In a process according to claim 11, the improvement wherein said hydroxytriazine is selected from the group consisting of ammelide, ammeline and mixtures thereof.

13. In a process according to claim 12, the improvement wherein said acid is carbon dioxide.

14. In a process according to claim 12, the improvement wherein said solution is acidified to a pH from about 6 to 7.

15. In a process for recovering melamine from an ammelide and ammeline impurities-containing ammoniacal solution produced by heating an aquo-ammono carbonic acid, which process comprises the steps of crystallizing and separating a major portion of said melamine from the solution and then crystallizing and separating the ammelide and ammeline from the mother liquor, the improvement which comprises:

stripping the ammonia from the mother liquor after separating said major portion of melamine from the solution; and then
acidifying the substantially ammonia-free liquor with carbon dioxide to a pH from about 6 to 7, prior to said step of crystallizing the ammelide and ammeline.

References Cited

UNITED STATES PATENTS

| 3,132,143 | 5/1964 | Fagagnolo et al. | 260—249.7 |
| 3,161,638 | 12/1964 | Christoffel et al. | 260—249.7 |
| 3,172,887 | 3/1965 | Bondi | 260—249.7 |
| 3,296,266 | 1/1967 | Nelson et al. | 260—249.7 |
| 3,423,411 | 1/1969 | Dakli et al. | 260—249.6 XR |

HENRY R. JILES, Primary Examiner

JOHN M. FORD, Assistant Examiner

U.S. Cl. X.R.

260—249.5, 249.8